UNITED STATES PATENT OFFICE.

JACOB D. GRAYBILL, OF SHREVEPORT, LOUISIANA.

COMPOUND FOR PRESERVING THE COLOR OF FINISHING-BRICKS.

SPECIFICATION forming part of Letters Patent No. 479,640, dated July 26, 1892.

Application filed April 30, 1892. Serial No. 431,353. (No specimens.)

*To all whom it may concern:*

Be it known that I, JACOB D. GRAYBILL, of Shreveport, in the parish of Caddo and State of Louisiana, have invented a new Compound for Preserving the Color of Finishing-Bricks, of which the following is a specification.

My invention is in the nature of a compound for the purpose of preventing the discoloration of pressed bricks or other finishing-bricks when laid up in the walls of buildings. This preparation is composed of the following ingredients and in about the proportion named, a little more or less of any of the ingredients making no perceptible difference in its effect. I take of ground or unground flaxseed, one pound; commercial glue, one-half pound; Japan drier, one-half pint; Venetian red, one-fourth pound.

The following is my method of preparing the compound for use: To one gallon of hot soft water add the flaxseed. Boil for a short time, and then strain through a coarse cloth to separate the shells or seeds from the liquid. To this liquid add while hot the glue, thoroughly dissolved. Stir well, and then add the Japan drier, and last add the Venetian red.

That the function and value of each ingredient of this compound may be better understood, I would state that the flaxseed is used partly for the oil it contains, which imparts water-proof properties, (there being no pure oil used,) and partly for its mucilaginous character, which imparts elasticity. The glue is used as a tough binder. The Japan drier is used for hardening, and the small quantity of Venetian red simply gives a tinge of color, but not enough to form a "pigment" in the ordinary sense of the term.

When desiring to apply the compound, add as much water as will make it flow freely from a brush and thoroughly penetrate the bricks and apply it thoroughly to the surface of the bricks. When the preparation is dry, the walls are water-proof.

The object of this preparation is to fill the pores of the bricks with an oily mucilaginous substance which, when dry, is hard and water-proof, thereby preserving the brilliant red color of pressed bricks as when first laid up in walls and protecting them from discoloration of all kinds.

Having thus described my invention, what I claim as new, and desire to secure by Letters Patent, is—

1. The compound for preserving the color of finishing-bricks, consisting of the oily and mucilaginous extract of flaxseed, glue, and Japan drier in an aqueous solution or menstruum in or about the proportions described.

2. The compound for preserving the color of finishing-bricks, consisting of the oily and mucilaginous extract of flaxseed, glue, Japan drier, and Venetian red in an aqueous solution or menstruum in or about the proportions described.

JACOB D. GRAYBILL.

Witnesses:
J. E. DYER, Jr.,
M. DINGLE.